United States Patent
Chen et al.

(10) Patent No.: US 11,213,958 B2
(45) Date of Patent: Jan. 4, 2022

(54) TRANSFERRING SYSTEM AND METHOD FOR TRANSFERRING AN OBJECT

(71) Applicant: SOLOMON TECHNOLOGY CORPORATION, Taipei (TW)

(72) Inventors: Cheng-Lung Chen, Taipei (TW); Yu-Yen Liu, Taipei (TW); Xuan Loc Nguyen, Taipei (TW); Tsung-Cheng Lai, Taipei (TW)

(73) Assignee: SOLOMON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 17/110,161

(22) Filed: Dec. 2, 2020

(65) Prior Publication Data

US 2021/0170609 A1   Jun. 10, 2021

(30) Foreign Application Priority Data

Dec. 5, 2019   (TW) .................... 108144506

(51) Int. Cl.
*B25J 15/06* (2006.01)
*B25J 9/16* (2006.01)
*B25J 18/02* (2006.01)

(52) U.S. Cl.
CPC ........... *B25J 18/025* (2013.01); *B25J 9/1661* (2013.01); *B25J 9/1697* (2013.01); *B25J 15/0616* (2013.01)

(58) Field of Classification Search
CPC ...... B25J 9/1656; B25J 9/1661; B25J 9/1697; B25J 13/08; B25J 15/0616; B25J 18/025; B25J 19/021; B25J 19/023; B25J 19/04
See application file for complete search history.

(56) References Cited

U.S. PATENT DOCUMENTS

| | | | | |
|---|---|---|---|---|
| 5,609,377 A | * | 3/1997 | Tanaka | B65G 47/918 294/65 |
| 6,721,444 B1 | * | 4/2004 | Gu | B25J 9/1697 345/419 |
| 7,313,464 B1 | * | 12/2007 | Perreault | B25J 9/1666 318/568.1 |

(Continued)

FOREIGN PATENT DOCUMENTS

| | | |
|---|---|---|
| CN | 1162681 C | 8/2004 |
| CN | 101059888 A | 10/2007 |
| CN | 107972059 A | 5/2018 |

(Continued)

OTHER PUBLICATIONS

English translation of JP 2015-43175 (Mar. 5, 2015).*

(Continued)

*Primary Examiner* — Dean J Kramer
(74) *Attorney, Agent, or Firm* — Hamre, Schumann, Mueller & Larson, P.C.

(57) ABSTRACT

A transferring system for transferring an object disposed in a storage area includes telescopic units, sucking disc units respectively connected to the telescopic units, and a control unit. The control unit calculates an area related to an object according to an image obtained by an imaging unit, and calculates a value of N based on the area. The value of N is a number of the sucking disc units used for picking up the object and is equal to or greater than one. The control unit determines N positions on the object, controls N telescopic units to move N sucking disc units toward the N positions, and controls the N sucking disc units to adhere respectively to the N positions so as to pick up the object from the storage area.

9 Claims, 10 Drawing Sheets

(56) References Cited

U.S. PATENT DOCUMENTS

| 9,987,746 | B2* | 6/2018 | Bradski | B25J 9/1671 |
|---|---|---|---|---|
| 2005/0226711 | A1* | 10/2005 | Schnoor | B65G 47/917 |
| | | | | 414/736 |
| 2008/0080962 | A1 | 4/2008 | Holtmeier | |
| 2015/0066199 | A1* | 3/2015 | Shimono | B25J 9/1687 |
| | | | | 700/218 |
| 2015/0314439 | A1* | 11/2015 | Wang | B25J 15/0061 |
| | | | | 700/262 |
| 2019/0228371 | A1* | 7/2019 | Murphy | B25J 9/1697 |
| 2021/0047115 | A1* | 2/2021 | Aiglstorfer | B25J 9/0093 |

FOREIGN PATENT DOCUMENTS

| JP | 2014-176926 A | 9/2014 |
|---|---|---|
| JP | 2015-043175 A | 3/2015 |
| WO | 2019/147697 A1 | 8/2019 |

OTHER PUBLICATIONS

Search Report appended to an Office Action, which was issued to Taiwanese counterpart application No. 108144506 by the TIPO dated Apr. 16, 2020, with an English translation thereof (2 pages).
Office Action issued to Japanese counterpart application No. 2020194688 by the JPO dated Apr. 20, 2021 (6 pages).
Search Report issued to European counterpart application No. 20211467.4 by the EPO dated May 4, 2021 (8 pages).
Kimura, et al, "Deep Learning-Based Object Recognition for Collaborative Motion between Manipulation and Moving Vehicle in Piece Picking Operation", 2018 JSME Conference on Robotics and Mechatronics, Jun. 2, 2018, and English abstract (4 pages).

\* cited by examiner

TRANSFERRING SYSTEM AND METHOD FOR TRANSFERRING AN OBJECT

CROSS-REFERENCE TO RELATED APPLICATION

This application claims priority of Taiwanese Invention Patent Application No. 108144506, filed on Dec. 5, 2019.

FIELD

The disclosure relates to a transferring system and a method for transferring an object, and more particularly to a transferring system and a method for transferring an object disposed in a storage area.

BACKGROUND

In a production line, a transferring device is usually employed to carry products, which assists in sorting and picking up the products. However, a product carried by the transferring device may tend to fall from the transferring device when the transferring device transfers the product with a relatively fast speed.

SUMMARY

Therefore, an object of the disclosure is to provide a transferring system and a method for transferring an object that are capable of alleviating the drawbacks of the prior art.

According to an aspect of the disclosure, a transferring system for transferring an object that is disposed in a storage area is provided. The transferring system includes an imaging unit, a plurality of telescopic units, a plurality of sucking disc units and a control unit. The imaging unit faces the storage area and is configured to capture an image. The sucking disc units are respectively connected to the telescopic units, and are configured to be driven respectively by the telescopic units to move toward and away from the object. The control unit is electrically connected to the imaging unit and the telescopic units.

The control unit is configured to:
control the imaging unit to image the object disposed in the storage area so as to obtain an integral image;
recognize the object in the integral image, and extract an object image showing the object from the integral image;
calculate an area related to the object according to the object image;
calculate a value of N based on the area, the value of N being a number of sucking disc units in a part of the sucking disc units that is to be used for picking up the object and being a positive integer equal to or greater than one;
calculate a center point of the object image;
determine N number of to-be-sucked positions on the object according to the center point;
control N number of the telescopic units that are respectively connected to N number of the sucking disc units in the part of the sucking disc units to move the N number of the sucking disc units respectively toward the N number of to-be-sucked positions on the object; and
control the N number of the sucking disc units to adhere respectively to the N number of to-be-sucked positions so as to pick up the object from the storage area.

According to another aspect of the disclosure, a method for transferring an object that is disposed in a storage area is provided. The method is to be implemented by a transferring system that includes an imaging unit, a plurality of telescopic units, a plurality of sucking disc units respectively connected to the telescopic units, and a control unit electrically connected to the imaging unit and the telescopic units. The method includes steps of:
controlling, by the control unit, the imaging unit to image the object disposed in the storage area so as to obtain an integral image;
recognizing, by the control unit, the object in the integral image and extracting an object image showing the object from the integral image;
calculating, by the control unit, an area related to the object according to the object image;
calculating, by the control unit, a value of N based on the area, the value of N being a number of sucking disc units in a part of the sucking disc units that is to be used for picking up the object and being a positive integer equal to or greater than one;
calculating, by the control unit, a center point of the object image;
determining, by the control unit, N number of to-be-sucked positions on the object according to the center point;
controlling, by the control unit, N number of a part of the telescopic units that are respectively connected to N number of the sucking disc units in the part of the sucking disc units to move the N number of the sucking disc units respectively toward the N number of to-be-sucked positions on the object; and
controlling, by the control unit, the N number of the sucking disc units to adhere respectively to the N number of to-be-sucked positions so as to pick up the object from the storage area.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the present invention is described in greater detail, it should be noted that where considered appropriate, reference numerals or terminal portions of reference numerals have been repeated among the figures to indicate corresponding or analogous elements, which may optionally have similar characteristics.

Figure 1:
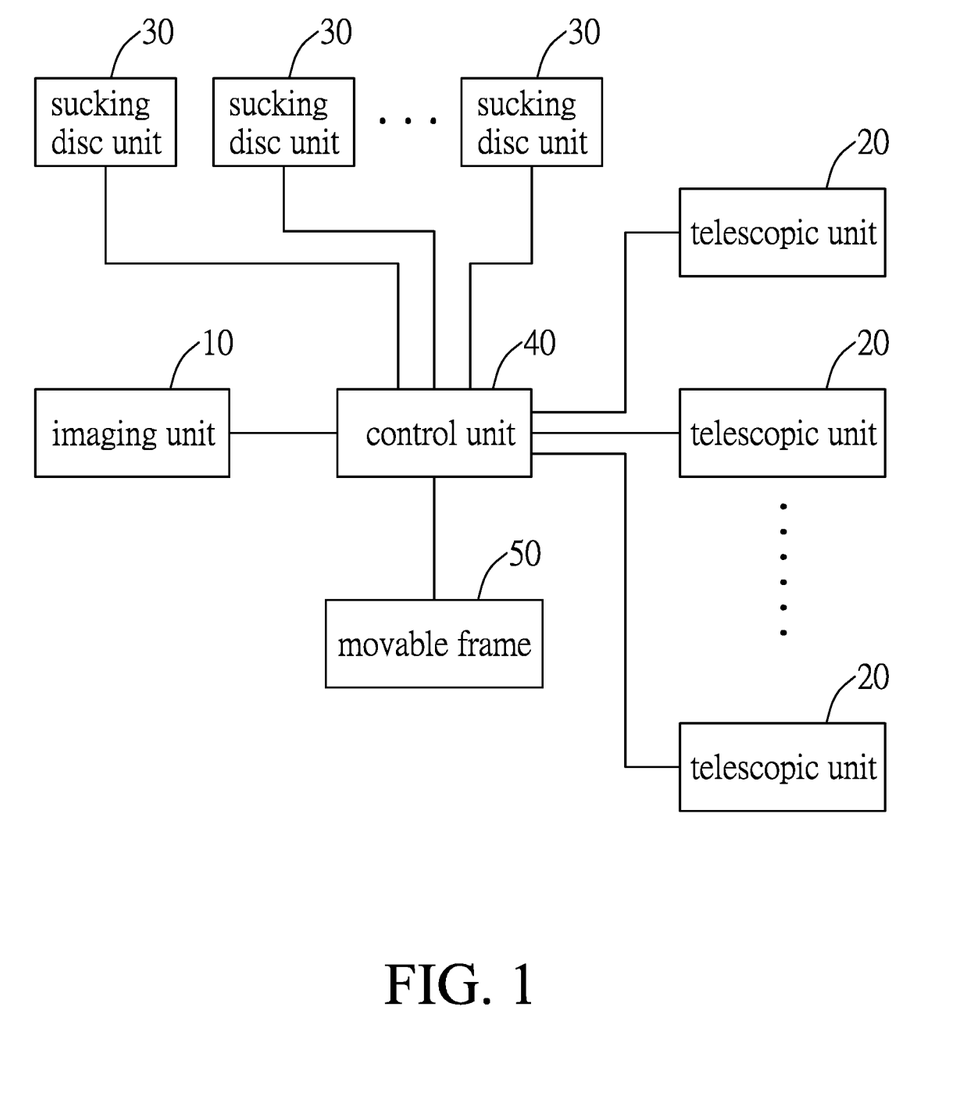
FIG. 1 is a block diagram of a transferring system according to an embodiment of the present disclosure.
Figure 2:
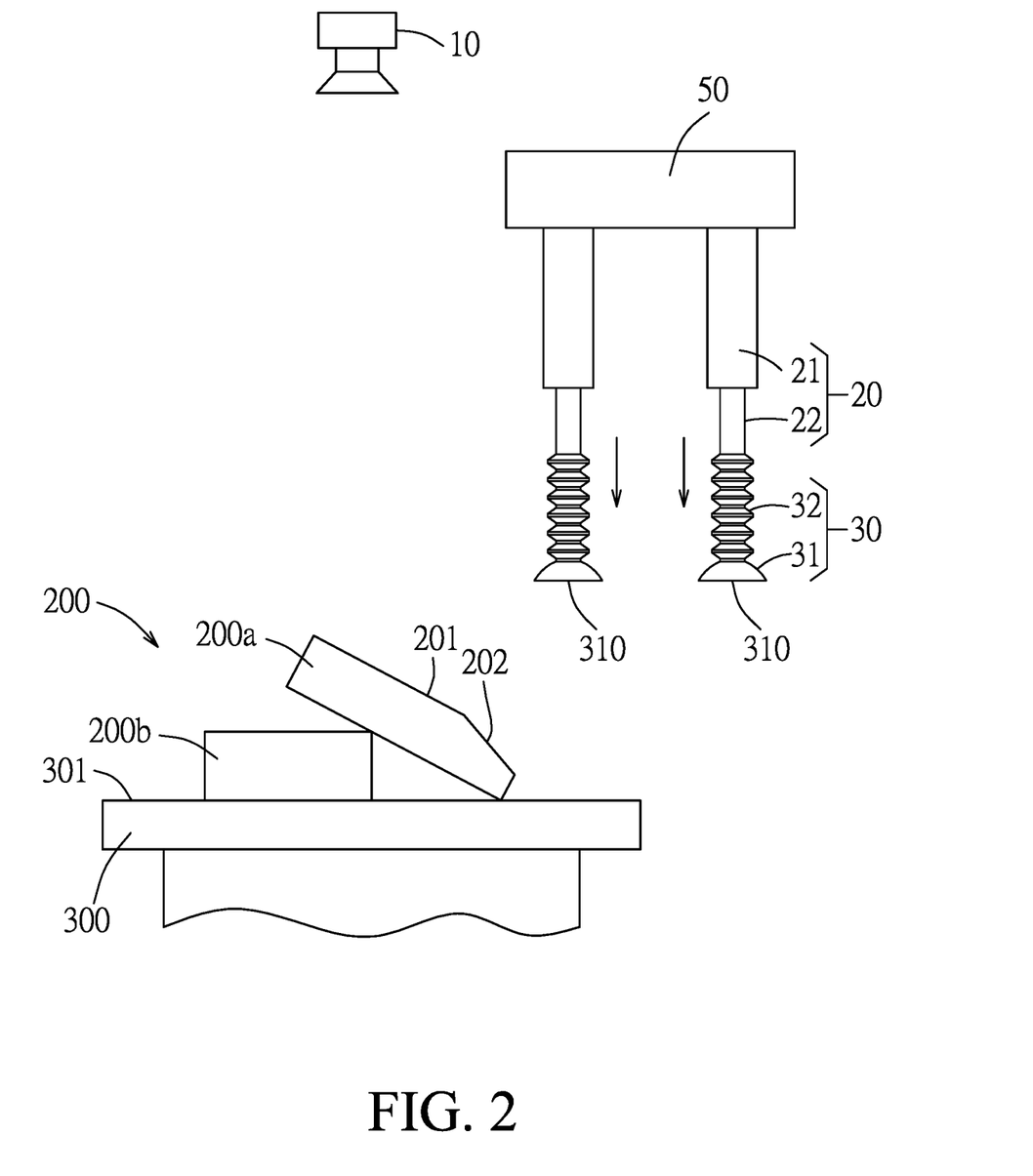
FIG. 2 is a schematic view of the transferring system, illustrating a plurality of objects disposed in a storage area to be picked up by the transferring system of the embodiment.

Referring to FIGS. 1 and 2, an embodiment of a transferring system according to the present disclosure is adapted for transferring a plurality of objects 200 disposed in a storage area 300. For example, the objects 200 include a first object 200a and a second object 200b, and are daily necessities (e.g., a bottle of shampoo), food products (e.g., a box of cookie), etc., and the types of the objects 200 are not limited to those described herein. The storage area 300 is used for temporarily storing the objects 200 before the objects 200 are being classified and packaged.

The transferring system includes an imaging unit 10, a plurality of telescopic units 20, a plurality of sucking disc units 30, a control unit 40 (not shown in FIG. 2) and a movable frame 50.

The imaging unit 10 faces the storage area 300 for imaging the storage area 300, and is, for example, a depth camera in this embodiment. It should be noted that other imaging devices (e.g., a three-dimensional (3D) scanner) may be used in other embodiments of the present disclosure. The movable frame 50 is disposed above the storage region 300, and the telescopic units 20 are mounted to and moved by the movable frame 50. The sucking disc units 30 are respectively connected to the telescopic units 20, and are configured to be driven respectively by the telescopic units 20 to move toward and away from the storage area 300 and the objects 200. It should be noted that, although FIG. 2 illustrates only two telescopic units 20 and two sucking disc units 30, the transferring system may include much more telescopic units 20 and sucking disc units 30 in practice. For example, the telescopic units 20 may be arranged in a matrix and more densely than the configuration shown in FIG. 2.

Each of the telescopic units 20 includes an upper tube 21 connected to the movable frame 50, and a lower stick 22 telescopically connected to the upper tube 21. Each of the sucking disc units 30 includes a sucking disc 31 and a bellows tube 32. The bellows tube 32 of each sucking disc unit 30 interconnects the sucking disc 31 and the lower stick 22 of a respective one of the telescopic units 20. The sucking disc 31 of each sucking disc unit 30 has a contact surface 310 to be adhered to the objects 200, for example, by forming vacuum between the contact surface 310 and the objects 200. It should be noted that in this embodiment, the structures of the sucking disc units 30 are identical and the areas of the contact surfaces 310 of the sucking discs 31 are the same.

The control unit 40 is, e.g., a control host, is electrically connected to the imaging unit 10, the telescopic units 20, the sucking disc units 30, and the movable frame 50, and is configured to control operations of the imaging unit 10, the telescopic units 20, the sucking disc units 30, and the movable frame 50. For example, the control unit 40 is a microcontroller or a controller including, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

Figure 8:
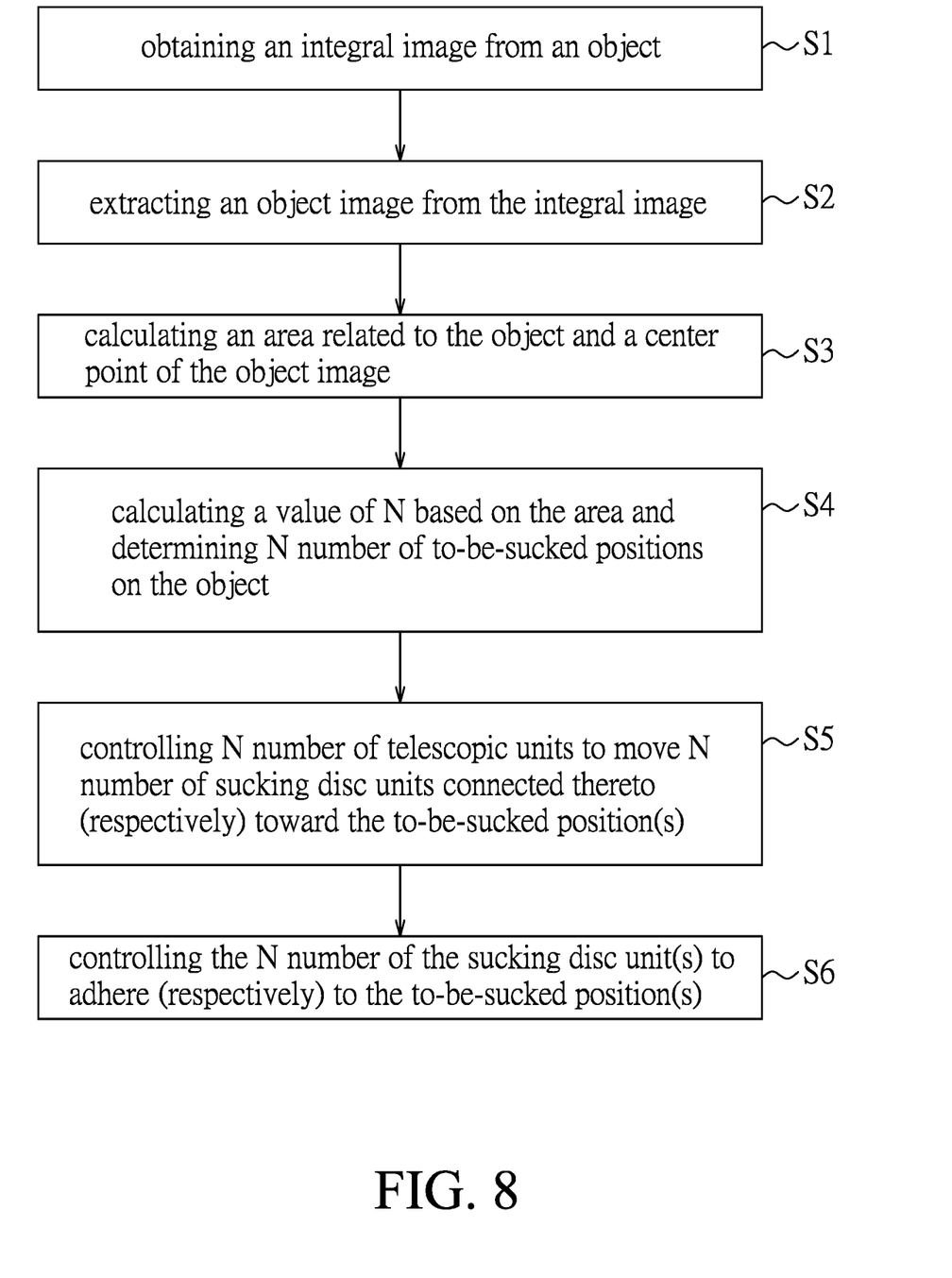
FIG. 8 is a flow chart illustrating steps of a method for transferring an object according to an embodiment of the present disclosure.

Referring to FIG. 8, a flow chart of a method for transferring the objects 200 disposed in the storage area 300 is illustrated. The method includes steps S1 to S5, and is to be implemented by the transferring system shown in FIGS. 1 and 2.

Figure 3:
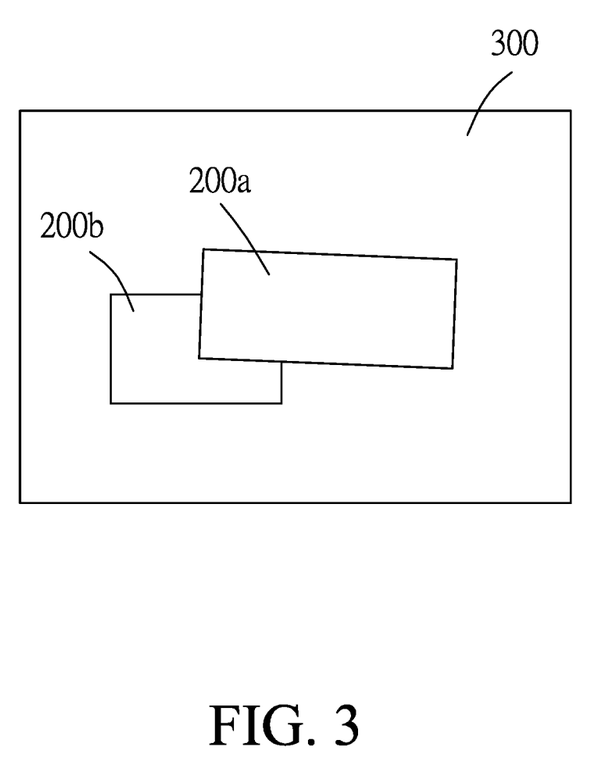
FIG. 3 is an exemplary integral image showing the objects disposed in the storage area.

In step S1, the control unit 40 controls the imaging unit 10 to image the objects 200 disposed in the storage area 300 so as to obtain an integral image (see FIG. 3). It should be noted that the integral image has a background (i.e., the storage area 300) and a foreground (i.e., the objects 200). In this embodiment, the integral image is a two-dimensional (2D) image showing the distances respectively to points (including the objects 200 and the storage area 300) in a scene from the imaging unit 10. In some embodiments where the imaging unit 10 includes a 3D scanner, the integral image may be a point cloud obtained by the 3D scanner, and is not limited to the example described herein as long as depth information, i.e., the distances from the imaging unit 10 to the respective points, is included in the integral image.

In step S2, the control unit 40 recognizes the objects 200 in the integral image, and extracts a plurality of object images respectively showing the objects 200a, 200b from the integral image. It should be noted that each of the object images only shows the corresponding object without the background of the integral image.

When more than one object images is extracted, the control unit 40 further determines which one of the objects 200 is a target object that is to be picked up. The target object is, for example, one of the objects 200 that is closest to the imaging unit 10 as determined by the control unit 40 according to the depth information included in the integral image, one of the objects 200 that is selected by a user, or one of the objects 200 that has a contour or a feature matching a pre-stored contour or feature of a designated object (e.g., an item ordered on an e-commerce platform). It should be noted that many pattern recognition algorithms can be used to implement feature comparison so as to determine whether the feature of any one of the objects 200 matches the pre-stored feature of the designated object, and details thereof are omitted herein since the features of this disclosure are not related to feature comparison. Then, the control unit 40 controls the telescopic units 20, the sucking disc units 30 and the movable frame 50 to pick up the target object first. In the following description, the method proceeds with one of the object images showing the target object (e.g., the first object 200a shown in FIG. 2).

In step S3, the control unit 40 calculates an area related to the object 200a based on the object image showing the object 200a (hereinafter referred to as "target object image"), and a center point 201 of the target object image. In this embodiment, the area related to the object 200a is a projected area of the object 200a which is projected on the storage area 300 from the imaging unit 10. It should be noted that the center point 201 can be obtained by using, e.g., machine vision technology known in the pertinent art, and is not limited to the specific manner as described herein.

In step S4, the control unit 40 calculates a value of N based on the area, and determines N number of to-be-sucked positions on a top surface of the object 200a according to the position of the center point 201. The value of N is a number of sucking disc units 30 in a part of the sucking disc units 30 that is to be used for picking up the object 200a, and is a positive integer equal to or greater than one. It should be noted that the value of N is in positive correlation to the area; that is to say, the greater the area, the larger the value of N. When the value of N is larger than one, the N number of to-be-sucked positions are evenly arranged around the center point 201. In one embodiment, the control unit 40 determines that the center point 201 is the to-be-sucked position when the value of N is equal to one.

Since vacuum is required to be formed between each sucking disc 31 used for picking up the object 200a and the top surface of the object 200a, the sucking discs 31 adhering on the top surface of the object 200a should not overlap one another or be disposed close to the edge of the object 200a. Therefore, the control unit 40 determines the N number of to-be-sucked positions further according to a contact area of the contact surface 310 of the sucking disc 31, a contour of the sucking disc 31, and a contour of the target object image.

Figure 4:
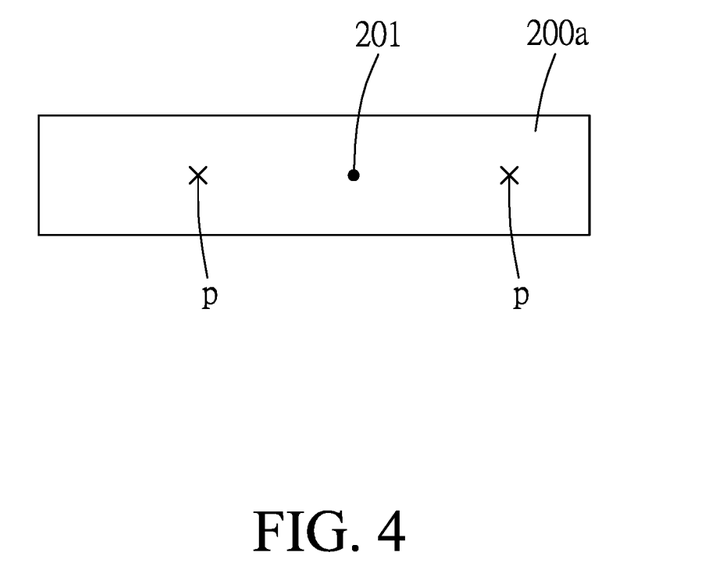
FIG. 4 is an exemplary object image showing one of the objects that is extracted from the integral image.

In this embodiment, as shown in FIG. 4, the value of N obtained in step S4 is two, and the control unit 40 determines two to-be-sucked positions (P) on the top surface of the object 200a.

Figure 5:
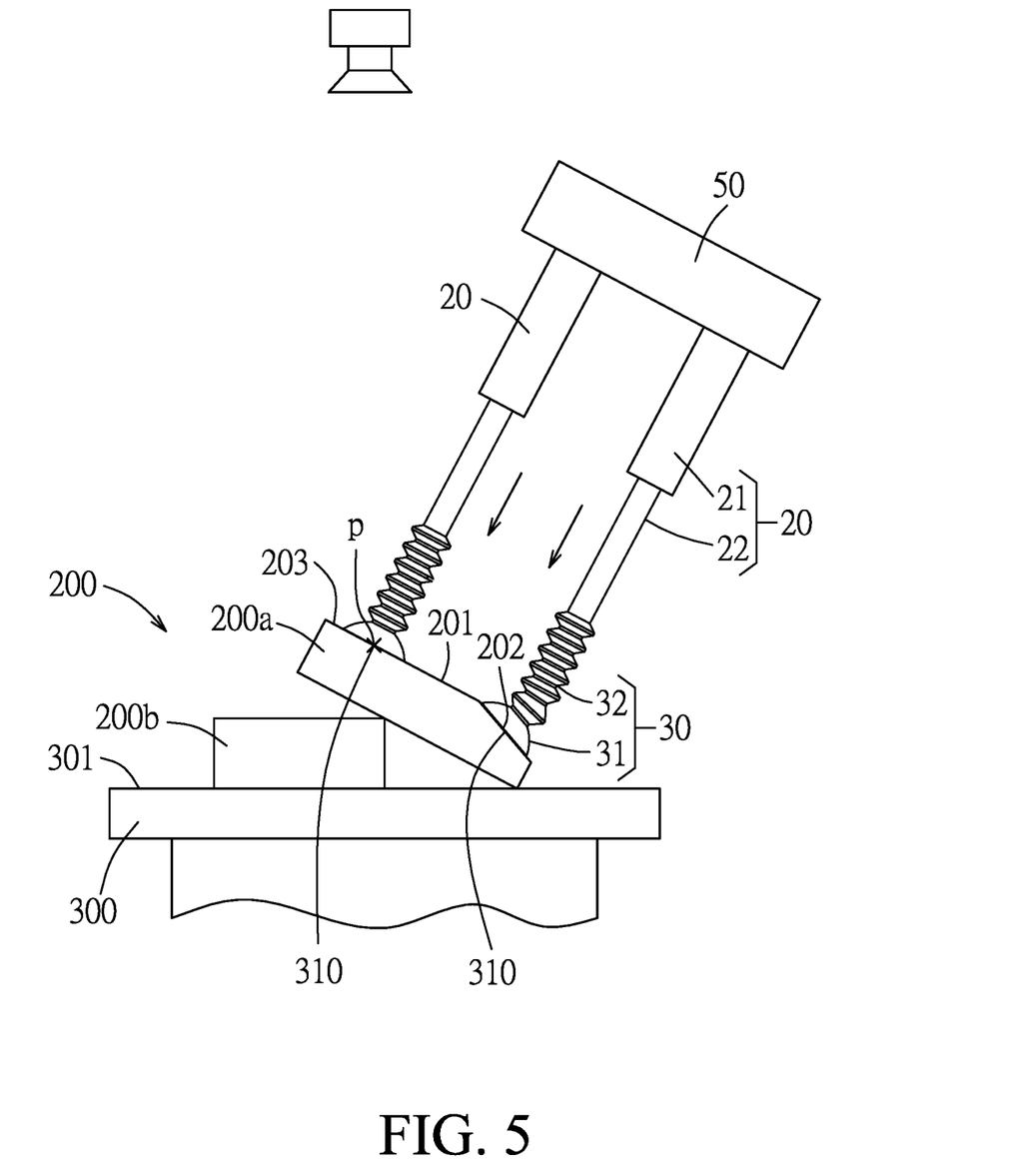
FIG. 5 is a schematic view of the transferring system, illustrating a plurality of sucking disc units of the transferring system adhering to an upper one of the objects for picking up the same from the storage area.

Subsequently, in step S5, the control unit 40 controls N number of the telescopic units 20 that are respectively connected to N number of the sucking disc units 30 in the part of the sucking disc units 30 to move the N number of the sucking disc units respectively toward the N number of to-be-sucked positions on the object 200a. Referring to FIG. 5, the control unit 40 controls two of the telescopic units 20 to move two of the sucking disc units 30 that are respectively connected to the two of the telescopic units 20 toward the two to-be-sucked positions (P). Specifically, the control unit 40 is configured to select the N number of the telescopic units 20 that are more aligned with the N number of to-be-sucked positions than the remaining one(s) of the telescopic units 20.

Referring further to FIG. 5, in this embodiment, before step S5, the control unit 40 further determines an inclined angle between the top surface of the object 200 and the storage area 300 according to the target object image, and makes the telescopic units 20 incline and be substantially perpendicular to the top surface of the object 200a according to the inclined angle. Specifically, the control unit 40 controls the movable frame 50 to incline and be substantially parallel to the top surface of the object 200a according to the inclined angle, such that the two of the telescopic units 20 are inclined and substantially perpendicular to the top surface of the object 200a. Then, the control unit 40 controls the two of the telescopic units 20 to extend the lower sticks 22 outwardly until the sucking discs 31 of the two of the sucking disc units 30 contact the top surface of the object 200a at the to-be-sucked positions (P). In this embodiment, the top surface of the object 200a includes a first portion 202 and a second portion 203 at which the two to-be-sucked positions (P) are respectively located, and the control unit 40 controls the lower sticks 22 to extend outwardly until the sucking discs 31 respectively contact the first portion 202 and the second portion 203. The configuration of the bellows tube 32 of each of the sucking disc units 30 allows the contact surfaces 310 of the sucking discs 31 of the two of the sucking disc units 30 to be parallel to the first and second portions 202, 203 and to fittingly abut against the first and second portions 202, 203, respectively. It should be noted that the two of the telescopic units 20 controlled by the control unit 40 are closer to the to-be-sucked positions (P) among all the telescopic units 20, and the actual sucked positions on the object 200a may be slightly different from the to-be-sucked positions (P) determined by the control unit 40.

In step S6, the control unit 40 controls the N number, i.e., two of the sucking disc units 30 to adhere respectively to the to-be-sucked positions (P) on the top surface of the objects 200a, so as to pick up the object 200a from the storage area 300. For example, a vacuum device (not shown) is connected to the sucking disc units 30 for sucking air out of the space between the sucking discs 31 of the two of the sucking disc units 30 and the top surface of the object 200a so that the sucking discs 31 adhere tightly to the object 200a. It should be noted that the vacuum device may be embedded in each of the sucking disc units 30 or may be an exterior vacuum device, and is not limited to the specific example described herein.

Figure 6:
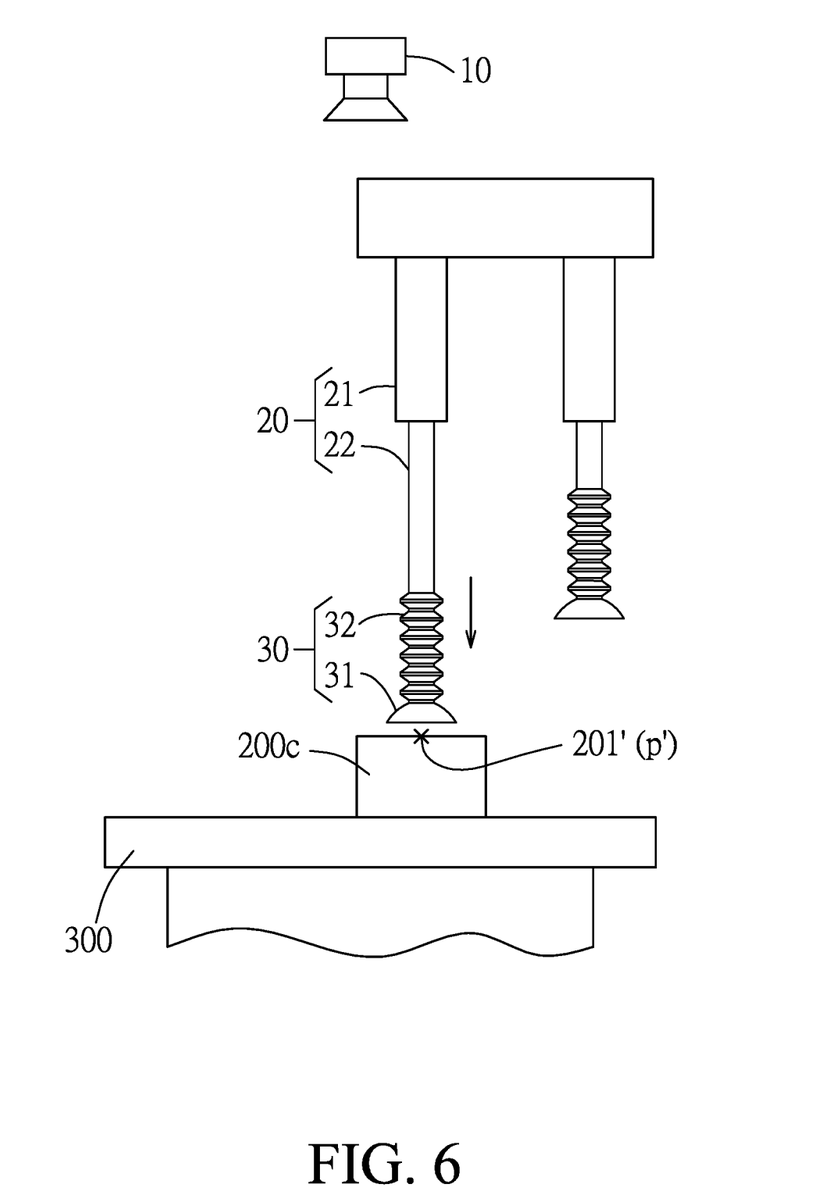
FIG. 6 is a schematic view of the transferring system, illustrating one of the sucking disc units to be used for picking up an object disposed in the storage area.
Figure 7:
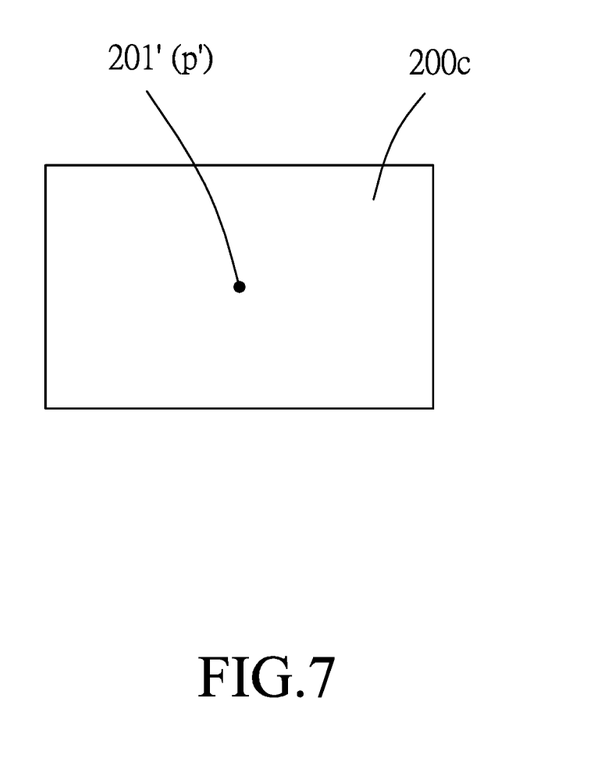
FIG. 7 is an exemplary object image showing the object shown in FIG. 7.

After the target object (i.e., the first object 200a) is picked up and transferred from the storage area 300 to some other place, the method may be performed again for transferring another one of the objects 200. Referring to FIGS. 6 and 7, the control unit 40 extracts another object image (see FIG. 7) showing an object 200c according to another integral image currently obtained by the imaging unit 10. The control unit 40 then calculates an area related to the object 200c, the value of N being a number of sucking disc units 30 in a part of the sucking disc units 30 that is to be used for picking up the object 200c, and a center point 201' of the object image, and determines N number of to-be-sucked positions on the object 200c. In this example, the value of N equals one, and the control unit 40 determines that the center point 201' is the to-be-sucked position (P'). The control unit 40 controls one of the telescopic units 20 that is closest to the to-be-sucked position (P') among the telescopic units 20 so as to move one of the sucking disc units 30 connected thereto toward the to-be-sucked position (P') on the object 200c. Finally, the control unit 40 controls the sucking disc units 30 to adhere to the to-be-sucked position (P') so as to pick up the object 200c from the storage area 300.

Figure 9:
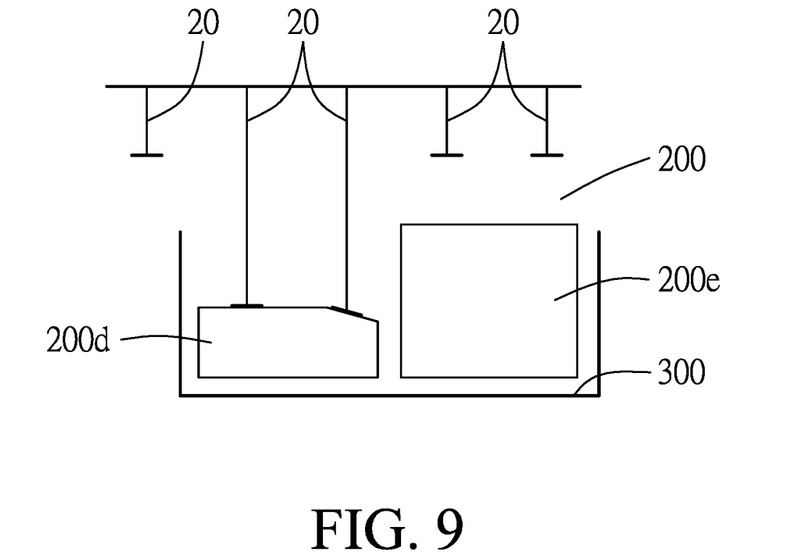
FIG. 9 is a schematic view of another embodiment of the transferring system, illustrating two of the sucking disc units adhering to a target one of the objects disposed in the storage area.

Referring to FIG. 9, another embodiment of the transferring system is shown. In this embodiment, the control unit 40 determines that the left one of the objects 200 (i.e., the object 200d) is the target object to be picked up by the sucking disc units 30. Since the control unit 40 controls two of the telescopic units 20 that are closest to the to-be-sucked positions on a top surface of the target object 200d among all the telescopic units 20, the right one of the objects 200 (i.e., the object 200e) would not obstruct picking up operations of the transferring system of the present disclosure.

Figure 10:
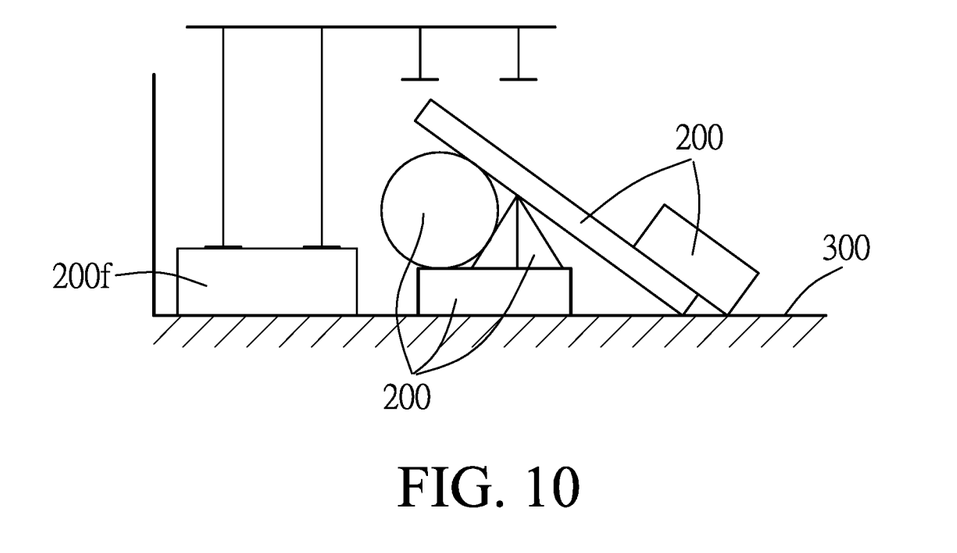
FIG. 10 is a schematic view illustrating the transferring system picking up a target one of the objects.

FIG. 10 illustrates that the transferring system is used in the storage area 300 which is cluttered up with a plurality of objects 200. In this example, the left one of the objects 200 (i.e., the object 200f) is the target object which can also be picked up from the storage area 300 by the transferring system.

Figure 11:
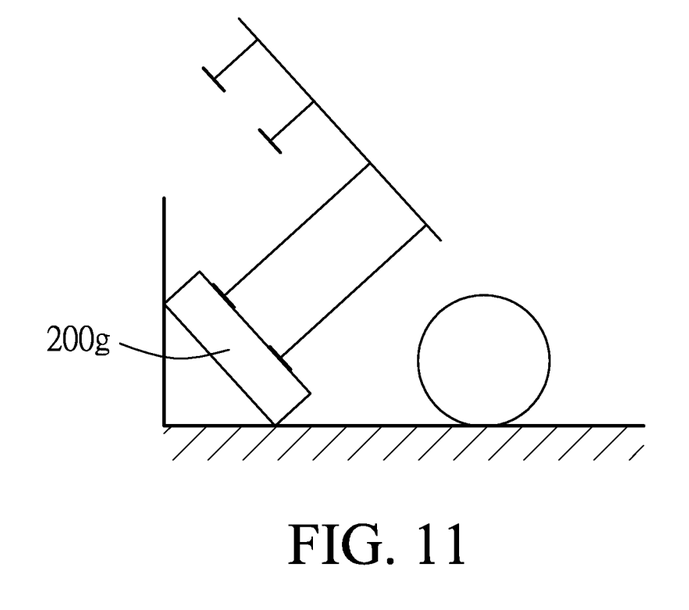
FIG. 11 is a schematic view illustrating that the transferring system is capable of picking up a target object inclinedly disposed at a corner.

Referring to FIG. 11, an example of using the transferring system when a target object 200g is inclinedly disposed at a corner of the storage area 300 is shown. Since the control unit 40 controls the movable frame 50 to incline and be substantially parallel to the top surface of the target object 200g according to the inclined angle determined in step S5, the target object 200g can also be picked up firmly from the storage area 300.

Figure 12:
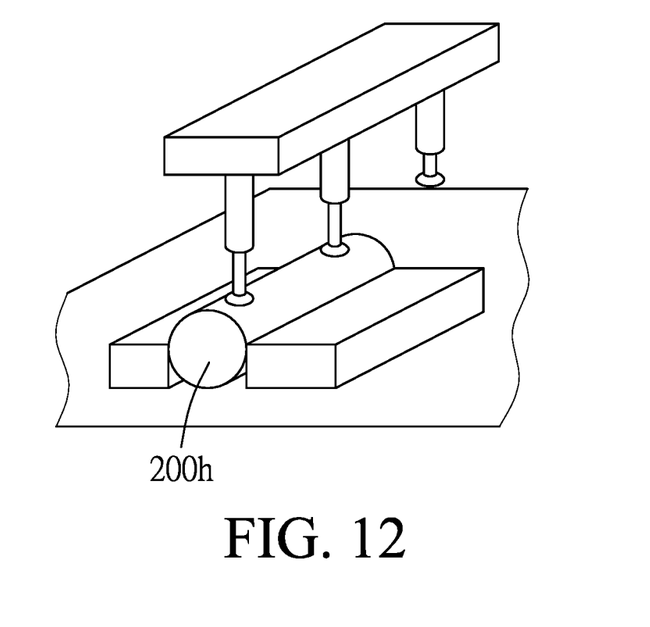
FIG. 12 is a schematic perspective view illustrating the transferring system picking up a cylindrical-shaped object.

FIG. 12 is another example showing that the transferring system of the present disclosure is capable of picking up a target object 200h that has a cylindrical shape. The above examples show that the transferring system of the present disclosure can be useful for picking up objects 200 in various environments, and is capable of picking up objects 200 with different shapes.

To sum up, by virtue of the transferring system and the method according to the present disclosure, after the imaging unit 10 obtains the integral image, the control unit 40 extracts the object image from the integral image, calculates the area of the object image according to the object image, and determines a suitable number of the sucking disc units 30 to be used for picking up the object based on the area, and determines the suitable number of the to-be-sucked position(s) on the object according to the center point, the contact area of the contact surface 310 of the sucking disc 31, the contour of the sucking disc 31 and the contour of the object image. In this way, a part of the sucking disc unit(s) 30 can adhere to the object in a relatively tight manner so as to prevent the object picked up by the sucking disc unit(s) 30 from falling when the object is transferred at a relatively high speed.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A transferring system adapted to take out an object from a storage area, comprising:
    an imaging unit facing the storage area and used for photographing the object;
    a plurality of telescopic units;
    a plurality of sucking disk units connected respectively to the telescopic units, and co-movably driven respectively by the telescopic units to approach the object or move away from the object; and
    a control unit electrically connected to the imaging unit and the telescopic units, and capable of controlling movement of the imaging unit and the telescopic units;
    wherein the control unit controls the imaging unit to photograph the object so as to obtain an integral image, the control unit identifying an object image showing the object in the integral image,
    the control unit calculating, according to the object image, area data indicating an area of the object image,
    the control unit generating a value of N, which is a number of sucking disks to be used according to the area data, where N is an integer not less than one,
    the control unit controlling a number N of the sucking disk units that are connected respectively to a number N of the telescopic units to attach to the object and to take out the object from the storage area;
    wherein the control unit calculates a center point of the object image, according to the object image,
    the control unit generating a number N of to-be-sucked positions according to the center point,
    the control unit controlling the number N of the sucking disk units that are connected respectively to the number N of the telescopic units to attach to the number N of to-be-sucked positions on the object;
    wherein the control unit generates the value of N according to the center point, a contact area of a surface of each sucking disk unit, a contour of each sucking disk unit and a contour of the object image.

2. The transferring system as claimed in claim 1, wherein each sucking disk unit includes a sucking disc, and a bellows tube connected to the sucking disc and the telescopic unit.

3. The transferring system as claimed in claim 1, wherein the control unit identifies that the object is inclined relative to the storage area by an inclined angle according to the object image, and the control unit makes the telescopic units substantially perpendicular to the to-be-sucked positions according to the inclined angle by which the object is inclined.

4. The transferring system as claimed in claim 1, wherein when the value of N is 1, the to-be-sucked position thus generated is the center point of the object image.

5. The transferring system as claimed in claim 1, wherein the storage area has a plurality of objects placed thereon, and the control unit identifies, according to the integral image, a plurality of object images corresponding respectively to a plurality of objects shown in the integral image.

6. A transferring method for taking out an object from a storage area by a transferring system, the transferring system comprising an imaging unit, a plurality of telescopic units, a plurality of sucking disk units connected respectively to the telescopic units, and a control unit electrically connected to the imaging unit and the telescopic units, the transferring method comprising:
    (A) the control unit controlling the imaging unit to photograph the object so as to obtain an integral image;
    (B) the control unit identifying an object image showing the object in the integral image;
    (C) the control unit calculating, according to the object image, area data indicating an area of the object image;
    (D) the control unit generating a value of N, which is a number of sucking disks to be used, according to the area data, where N is an integer not less than one;
    (E) the control unit controlling a number N of the sucking disk units that are connected respectively to a number N of the telescopic units to attach to the object and to take out the object from the storage area;
    wherein, in step (C), the control unit further calculates a center point of the object image according to the object image;
    in step (D), the control unit generates a number N of to-be-sucked positions according to the center point; and
    in step (E), the control unit controls the number N of the sucking disk units that are connected respectively to the number N of the telescopic units to attach to the number N of to-be-sucked positions on the object;

wherein, in step (D), the control unit generates the value of N according to the center point, a contact area of a surface of each sucking disk unit, a contour of each sucking disk unit and a contour of the object image.

7. The transferring method as claimed in claim 6, wherein, in step (B), the control unit identifies that the object is inclined relative to the storage area by an inclined angle according to the object image, and in step (E), the control unit makes the telescopic units substantially perpendicular to the to-be-sucked positions according to the inclined angle by which the object is inclined.

8. The transferring method as claimed in claim 6, wherein, in step (D), when the value of N is 1, the to-be-sucked position thus generated is the center point of the object image.

9. The transferring method as claimed in claim 6, wherein, in step (B), the storage area has a plurality of objects placed thereon, and the control unit identifies, according to the integral image, a plurality of object images corresponding respectively to a plurality of objects shown in the integral image.

\* \* \* \* \*